United States Patent
Song

(10) Patent No.: US 8,225,746 B2
(45) Date of Patent: Jul. 24, 2012

(54) PET BED

(75) Inventor: Wonjung Song, Richmond, CA (US)

(73) Assignee: Worldwise, Inc., San Rafael, CA (US)

( * ) Notice: Subject to any disclaimer, the term of this patent is extended or adjusted under 35 U.S.C. 154(b) by 832 days.

(21) Appl. No.: 11/716,256

(22) Filed: Mar. 9, 2007

(65) Prior Publication Data

US 2008/0216752 A1 Sep. 11, 2008

(51) Int. Cl.
*A01K 29/00* (2006.01)
(52) U.S. Cl. ................................. 119/28.5; D30/118
(58) Field of Classification Search .............. 119/28.5; D30/118
See application file for complete search history.

(56) References Cited

U.S. PATENT DOCUMENTS

| | | | |
|---|---|---|---|
| 6,574,810 B2 * | 6/2003 | Mangiaracina | 5/655 |
| D563,058 S * | 2/2008 | Lamstein et al. | D30/118 |
| D564,709 S * | 3/2008 | Lamstein et al. | D30/118 |
| D571,055 S * | 6/2008 | Song | D30/118 |
| D577,158 S * | 9/2008 | Song | D30/118 |
| 2002/0108578 A1 * | 8/2002 | Kostial | 119/28.5 |
| 2006/0266294 A1 * | 11/2006 | Holmes et al. | 119/28.5 |
| 2006/0288943 A1 * | 12/2006 | Ku | 119/28.5 |

\* cited by examiner

*Primary Examiner* — Kristen C Hayes
(74) *Attorney, Agent, or Firm* — Bay Area Technology Law Group PC

(57) ABSTRACT

A pet bed that includes a fabric shell and a fill material contained therein. The shell defines a support region and sidewalls radially emanating therefrom. The sidewalls are defined by stitching which also define the support region and radially extending from the support region to substantially the outer edge of the sidewalls thus defining pocket regions therein. The sidewalls are sized to extend diagonally from the support region in a first orientation when in use and forming a substantially planar surface with the support region in a second orientation during storage.

7 Claims, 2 Drawing Sheets

PET BED

TECHNICAL FIELD

The present invention relates to a pet bed sized to engage a typical domestic pet, such as a cat or dog. The pet bed is configured in a way to provide excellent support and comfort for a pet and yet capable of assuming various orientations in order to reduce shipping costs and storage volumes.

BACKGROUND OF THE INVENTION

There are a plethora of pet beds offered to consumers sized to support and engage cats, dogs and other domestic animals of a wide variety of sizes and shapes. Such beds are usually rectangular or oval in shape and have a cushioned or padded region intended to support a pet to promote rest and relaxation. Oftentimes, pets develop a strong affinity for their beds and seek them out as a safe haven promoting rest and relaxation.

Most pet bed manufacturers currently employ offshore manufacturers capable of producing such products at costs far less than those that would be incurred if manufacturing was carried out domestically. Once manufactured in an offshore location, the beds must be transported, usually by containerized vessels. Because of the relatively low cost of offshore manufacture, the transportation costs in bringing these products to domestic facilities can oftentimes approach or even exceed the actual cost of manufacture. It is thus of strong economic importance to provide a pet bed which not only provides the intended comfort to a pet but also can be oriented and configured to occupy minimum shipping and storage volumes.

SUMMARY OF THE INVENTION

The present invention is directed to a pet bed comprising a fabric shell and fill material contained therein, said shell defining a support region and sidewalls radially emanating therefrom. The sidewalls are defined by stitching that further define the support region and radially extend from the support region to substantially the outer edge of the sidewalls defining pocket regions therein. The sidewalls are sized to extend diagonally from the support region in a first orientation when in use while forming a substantially planar surface with said support region in a second orientation during storage.

DETAILED DESCRIPTION OF THE INVENTION

Figure 1:
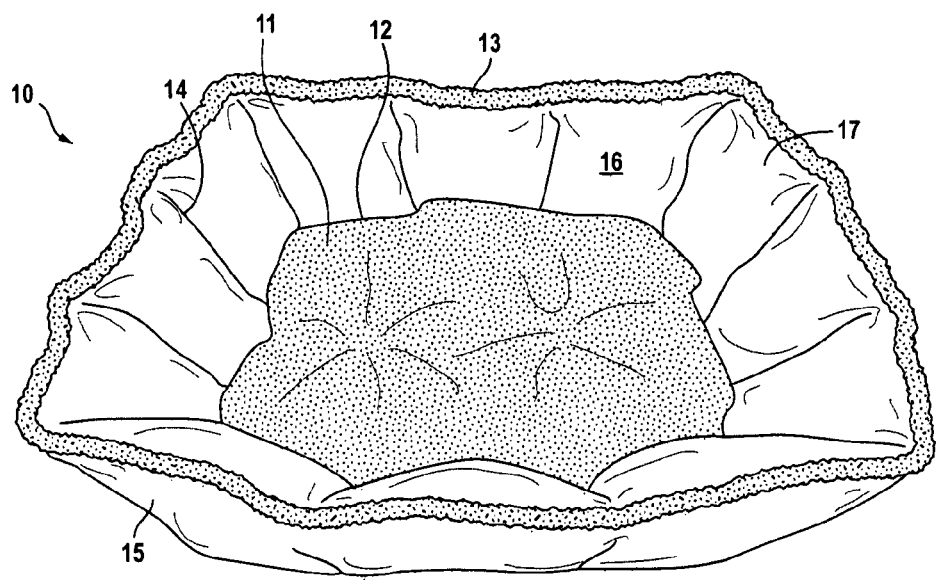
FIG. 1 is a perspective view of the pet bed of the present invention.

Turning first to FIG. 1, the characteristics of pet bed 10 are illustrated lending themselves to the characteristics sought after herein Pet bed 10 comprises an outer shell material 15 such as cotton, nylon, and various artificial and natural fabrics providing both comfort and durability Shell fabric 15 contains a fill material such as chopped foam, down and acrylics providing a fullness to the pet bed to again promote sleep and relaxation to a pet residing therein, Such fill material is generally confined to pocket region 16 through the use of radially extending stitching 14 extending from a support region beneath pillow insert 11 to substantially outer edge 13 thereof Pillow insert 11 extends to stitching 12 defining the support region and is preferably removable therefrom for cleaning and to support reversibility, the latter discussed hereinafter To summarize, pet bed 10 is provided with fairly elongated sidewall 17 being stitched to create segmented pocket regions 16 containing fill material and extending, during use, diagonally from a centrally located support region defined by stitching 12 beneath pillow insert 11

Figure 5:
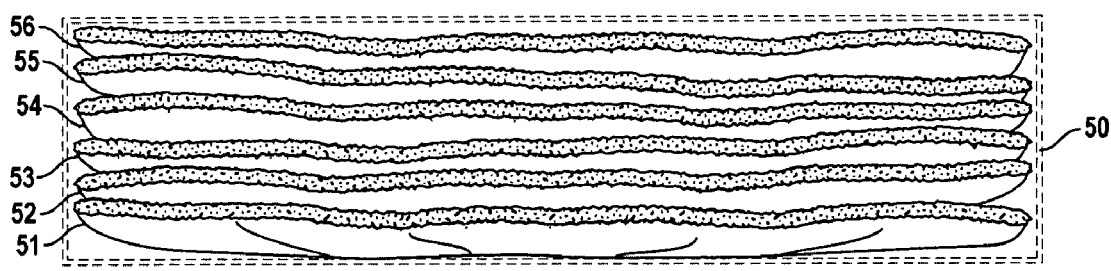
FIG. 5 is a side plan view of a stack of pet beds of the present invention in an orientation suitable for shipping and storing such products.

As noted previously, the thrust of the present invention is to provide a pet bed which can assume several orientations, the first of which being depicted in FIG. 1 wherein sidewalls 17 extend diagonally from the centrally located support region However, during shipment, sidewall 17 can be repositioned to a second orientation whereby sidewall 17 remain substantially planar with the support region This is best illustrated in reference to FIG. 5 where pet beds 51 through 56 are shown stacked in the above-described substantially planar orientation within a shipping container, the boundaries of which are illustrated as phantom boundary 50 Because of the relative geometry of sidewall 17 with respect to the overall structure of the pet bed and the use of radially extending stitching creating pocket 16 of fill material, once the subject pet bed has been shipped from an offshore manufacturing facility, shipping container 50 can be opened and each pet bed 51 through 56 reoriented to assume the geometry depicted in FIG. 1 by simply urging sidewalls 17 upwardly. Stitching 14 helps to maintain sidewalls 17 in the desired diagonal orientation with respect to the centrally located support region and pillow insert 11

Figure 2:
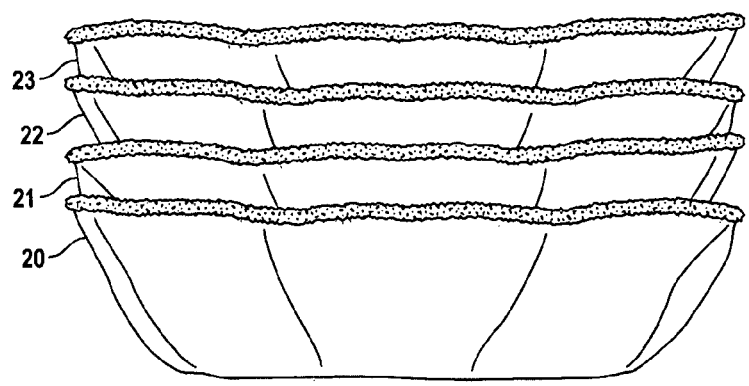
FIG. 2 is a side plan view of multiple pet beds of the present invention stacked with respect to one another.

An alternative to establishing a planar orientation as depicted in FIG. 5 is shown in FIG. 2. Specifically, pet beds 20 to 23 can be nested, one within the other to create a stack of beds. This configuration is most ideally suited for storing the present pet beds in a retailer's warehouse for display and sale. In doing so, it is oftentimes advantageous to remove pillow insert 11 to enable a vertically stacked nest of beds to assume the most compact vertical height.

Figure 3:
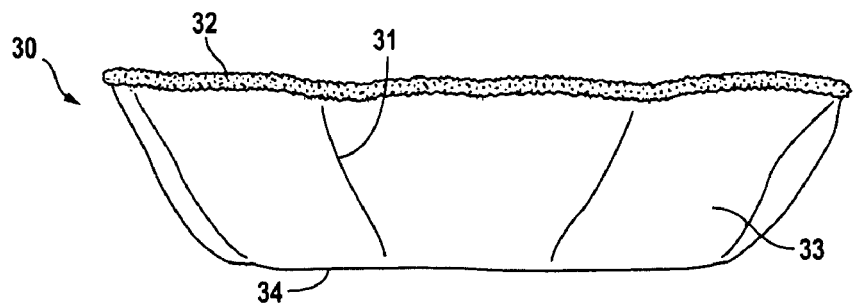
FIGS. 3 and 4 are side plan views of the pet bed of the present invention shown as assuming first and second orientations making the pet bed reversible.
Figure 4:
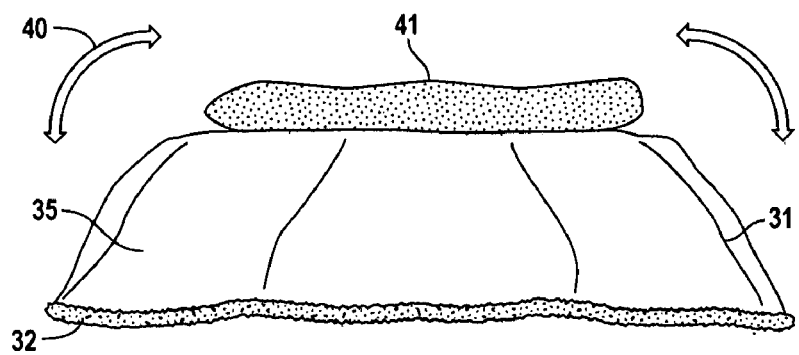

FIG. 3 depicts pet bed 30 akin to that shown in FIG. 1. Specifically, flat bottom 34 is intended, in use, to reside upon a horizontal surface, such as a floor enabling sidewalls 33 to extend diagonally therefrom, the orientation and preferred characteristics of sidewalls 33 being established by stitching 31 extending substantially to top edge 32. As a preferred embodiment, however, sidewalls 33 can be moved beyond a planar orientation with regard to surface 34 by moving them in the direction of arrows 40 thus inverting sidewalls 33. The pet bed would then be turned 180 degrees and pillow insert 41 removed from its previous location shown in FIG. 4 and placed within the inverted bed to make it reversible. This can be done for aesthetics as the shell fabric constituting sidewalls 33 can differ from the fabric constituting sidewalls 35. Also, one of the fabrics could be more soil resistant while the other more plush to present a different tactile experience to a pet in order to satisfy its needs and also to provide a diverse experience.

It is quite apparent from the above discussion, what is now presented is a pet bed which has all of the rest and sleep inducing characteristics of its competitive products but yet can be transported from offshore manufacturing facilities in a more compact and thus cost efficient manner than competitive beds and yet which can be made reversible while enabling a pillow insert to be removable for cleaning and replacement.

What is claimed is:

1. A pet bed comprising a fabric shell and fill material contained therein, said shell defining a support region and a continuous sidewall radially emanating therefrom, said continuous sidewall having an outer edge and stitching defining said support region and radially extending from said support region to substantially the outer edge of said sidewall, said stitching defining pocket regions therein, said sidewalls being sized to extend diagonally from said support region in a first orientation when in use and forming a substantially planar surface with said support region in a second orientation during storage.

2. The pet bed of claim 1 further comprising a pillow insert sized to reside within said support region during use.

3. The pet bed of claim 2 wherein said pillow insert is removable from said support region.

4. The pet bed of claim 2 wherein said continuous sidewall is sized and configured to be rotated from a first orientation diagonal to said support region to a second orientation substantially planar with said support region to a third orientation diagonally opposed to said first orientation to provide for a pet bed that is reversible.

5. The pet bed of claim 4 wherein as said pet bed is moved from said first to said third orientation, said pillow insert is removable and is caused to reside on said fabric shell on an opposite side from said support region, defining a second support region thereon.

6. The pet bed of claim 1 wherein a plurality of such pet beds are sized to nest against one another creating a stack of said pet beds.

7. The pet bed of claim 6 wherein said plurality of pet beds are sized to nest against one another in both said first and second orientations.

* * * * *